US010938943B2

(12) United States Patent
Chakra et al.

(10) Patent No.: US 10,938,943 B2
(45) Date of Patent: Mar. 2, 2021

(54) CONTEXT AWARE STREAMING OF SERVER MONITORING DATA

(71) Applicant: INTERNATIONAL BUSINESS MACHINES CORPORATION, Armonk, NY (US)

(72) Inventors: Al Chakra, Apex, NC (US); Mik Clarke, Ellenbrook (AU); Mark Shewell, Perth (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 412 days.

(21) Appl. No.: 15/443,243

(22) Filed: Feb. 27, 2017

(65) Prior Publication Data

US 2018/0248777 A1    Aug. 30, 2018

(51) Int. Cl.
*G06F 15/173* (2006.01)
*H04L 29/08* (2006.01)
*H04L 12/24* (2006.01)
*H04L 12/26* (2006.01)
*H04L 29/06* (2006.01)

(52) U.S. Cl.
CPC .......... *H04L 67/30* (2013.01); *H04L 41/0806* (2013.01); *H04L 41/0816* (2013.01); *H04L 43/06* (2013.01); *H04L 43/12* (2013.01); *H04L 65/602* (2013.01); *H04L 41/14* (2013.01)

(58) Field of Classification Search
CPC ......... H04L 43/08; H04L 41/14; H04L 65/60; H04L 67/30

USPC ........................................................ 709/224
See application file for complete search history.

(56) References Cited

U.S. PATENT DOCUMENTS

| | | | |
|---|---|---|---|
| 2001/0013008 A1* | 8/2001 | Waclawski | G06F 11/3409 702/186 |
| 2005/0076243 A1* | 4/2005 | Morohashi | G06Q 40/08 726/4 |
| 2005/0188056 A1* | 8/2005 | Kangas | H04L 67/303 709/218 |
| 2011/0071963 A1 | 3/2011 | Piovesan et al. | |
| 2012/0290576 A1 | 11/2012 | Amorim | |
| 2014/0040445 A1* | 2/2014 | Beckert | H04L 67/2823 709/223 |
| 2014/0063237 A1 | 3/2014 | Stone et al. | |
| 2014/0280338 A1 | 9/2014 | Metz et al. | |
| 2014/0330926 A1 | 11/2014 | Nano et al. | |

(Continued)

OTHER PUBLICATIONS

Jaikumar Vijayan, "Streaming Analytics: Business Value From Real-Time Data", Streaming Analytics: Business Value From Real-Time Data—Datamation, Feb. 23, 2015, pp. 1-3.

*Primary Examiner* — Hannah S Wang
(74) *Attorney, Agent, or Firm* — Cantor Colburn LLP; Teddi Maranzano

(57) ABSTRACT

Technical features are described for facilitating streaming of monitoring data from a server to multiple analytics nodes. For example, a method for streaming the monitoring data includes registering, by a data streamer, an analytics node by creating a profile corresponding to the analytics node. The method further includes adding, to the profile, a data type used by an insight engine that is executed by the analytics node. The method further includes streaming data of the data type to the analytics node for the insight engine to analyze, based on the profile.

13 Claims, 6 Drawing Sheets

(56) References Cited

U.S. PATENT DOCUMENTS

2014/0344328 A1\* 11/2014 Chakra ............... H04L 67/2842
  709/203
2017/0109327 A1\* 4/2017 Lei ......................... G06F 17/30
2017/0279654 A1\* 9/2017 Kinoshita ............. G06F 9/5005

\* cited by examiner

CONTEXT AWARE STREAMING OF SERVER MONITORING DATA

BACKGROUND

The present application relates to computer technology, and more specifically, to improving monitoring of the performance of servers.

In the face of exploding data volumes and shrinking decision time windows, service providers have to make key business decisions in real-time to remain competitive. Accordingly, in the IT Operations Analytics domain server, administrators use multiple analytics engines to analyze data from the server. Example analytics engines include SPLUNK™, SUMO LOGIC™, APACHE SOLR™, ELK™, SOLARWINDS™ YMOR™, ZENOSS™, VMTURBO™, TEAMQUEST™, CORELOGIC™, etc.

Multiple analytics engines are used for multiple reasons. For example, each analytics engine may provide a different set of insights based on identifying patterns in the data. Typically, such insights are the direct interpretation from human knowledge and experiences. Alternatively, or in addition, one analytics engine may be good at performance data and metrics for capacity planning, while another may be good at proactive problem detections and outage avoidance, yet another may be good at predictive and anomaly detection and scoring. The insights that the engines provide are the differentiators of such analytics engines.

However, different analytics engines use different types of data and/or data-types. Further, as newer analytics engines are developed and used, newer data types are requested.

SUMMARY

According to one or more embodiments, a method for streaming the monitoring data includes registering, by a data streamer, an analytics node by creating a profile corresponding to the analytics node. The method further includes adding, to the profile, a data type used by an insight engine that is executed by the analytics node. The method further includes streaming data of the data type to the analytics node for the insight engine to analyze, based on the profile.

According to one or more embodiments, a system for streaming monitoring data to multiple analytics nodes includes a memory, and a processor that is coupled with the memory. The processor registers an analytics node by creating a profile corresponding to the analytics node. The processor adds, to the profile, a data type used by an insight engine that is executed by the analytics node. The processor further streams data of the data type to the analytics node for the insight engine to analyze, based on the profile.

According to one or more embodiments, a computer program product for streaming monitoring data to multiple analytics nodes includes a computer readable storage medium having program instructions embodied therewith. The program instructions are executable by a processing circuit to cause the processing circuit to register an analytics node from the plurality of analytics nodes by creating a profile corresponding to the analytics node. The instructions further cause the processing circuit to add, to the profile, a data type used by an insight engine that is executed by the analytics node. The instructions further cause the processing circuit to stream data of the data type to the analytics node for the insight engine to analyze, based on the profile.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Described here are technical features for facilitating a computer, such as a server to be dynamically aware of available analytics engine and the data types used by the analytics engine, and to route a specific data type to a specific analytics engine. As such the technical solutions are rooted in and/or tied to computer technology in order to overcome a problem specifically arising in the realm of computers, specifically servers that stream data to multiple different analytics engines.

Alternatively, or in addition, the technical features provide a context aware data streamer that determines, from a set of analytics engines, to which analytics engine(s) to forward a specific type of data. The technical features determine the analytics engine based on data type/goal/nature of the specific data according to the insights provided by the analytics engines available at the time of data forwarding.

Further, when a new analytic engine comes online, the analytic engine is registered with the data streamer. The analytics engine informs the data streamer the types of data that the analytics engine uses to generate its insights. In one or more examples, in response to the registration, the data streamer turns on or off gathering specific data depending on whether there are currently active analytics engines using such data. The data streamer thus saves processing time and resourced by turning off the generation of potentially voluminous data, if there is no analytics engine looking at such data. Thus, using the technical features herein, the data streamer can automatically improve the performance of the server without human intervention. Further, the data stream implementing the technical features herein can optimally configure the server when a new analytics engine is installed or linked to the server to analyze data.

Further yet, in one or more examples, each insight engine from an analytics engine individually registers with the data streamer. The insight engine is a module or component of the analytics engine that generates a specific insight by analyzing the data. In one or more examples, an analytics engine includes multiple insight engines.

Figure 1:
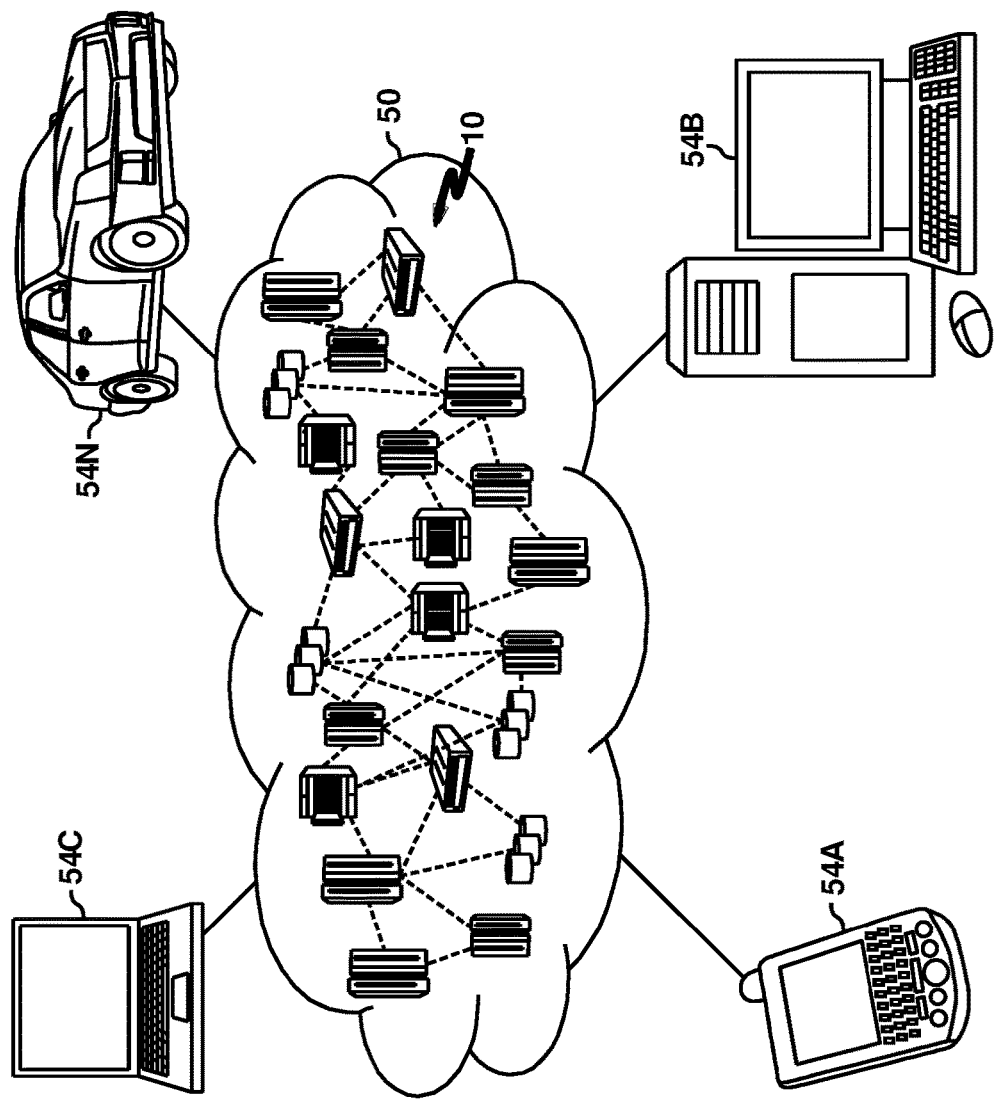
FIG. 1 depicts a cloud computing environment according to one or more embodiments.

The technical features described herein, thus, facilitate improving a server, or a cluster of servers, such as used in a cloud computing environment. For example, FIG. 1 depicts a cloud computing environment according to one or more embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
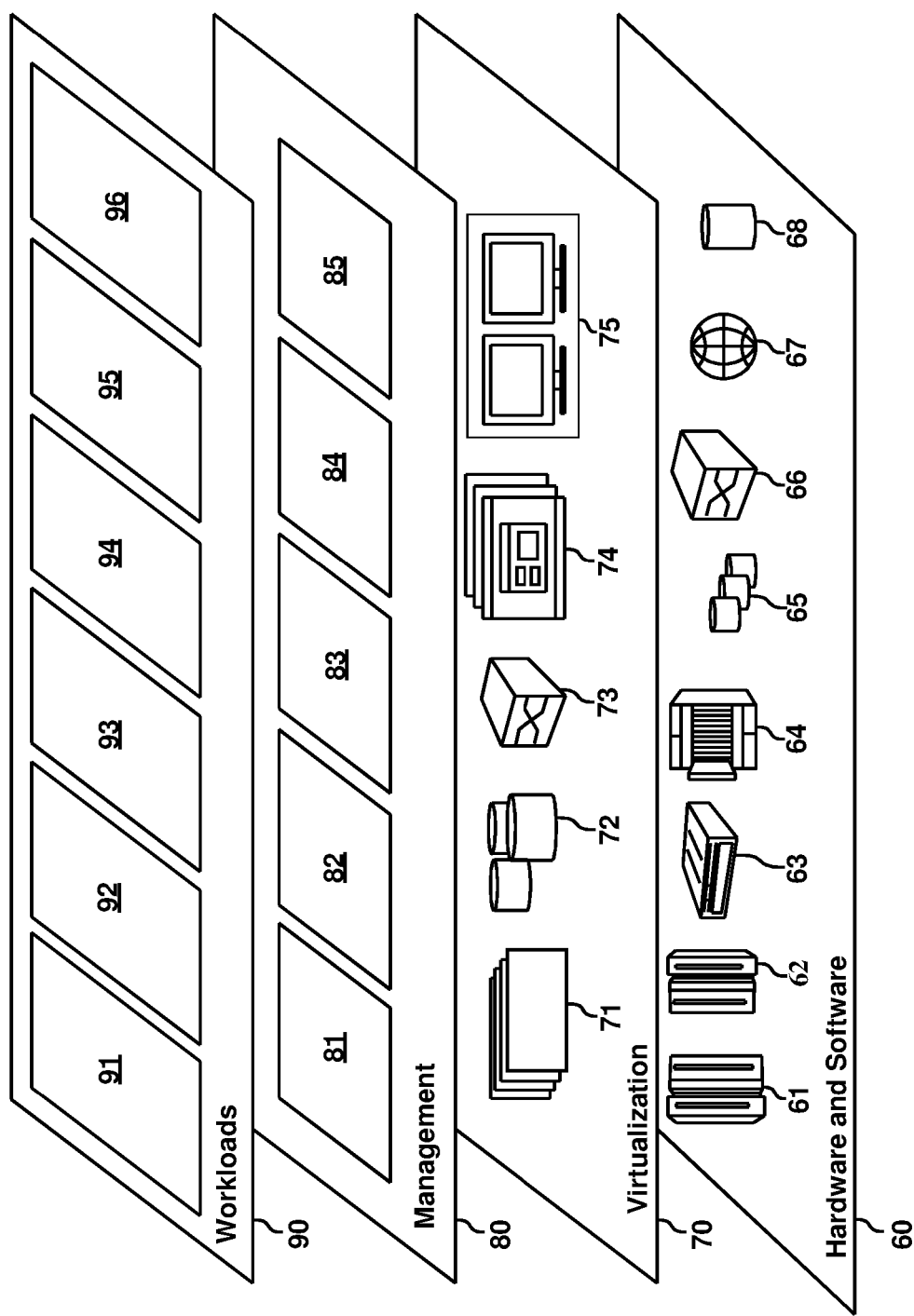
FIG. 2, a set of functional abstraction layers provided by cloud computing environment according to one or more embodiments.

Referring now to FIG. 2, a set of functional abstraction layers provided by cloud computing environment 50 (FIG. 1) is shown. It should be understood in advance that the components, layers and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and streaming data for analytics 96.

Figure 3:
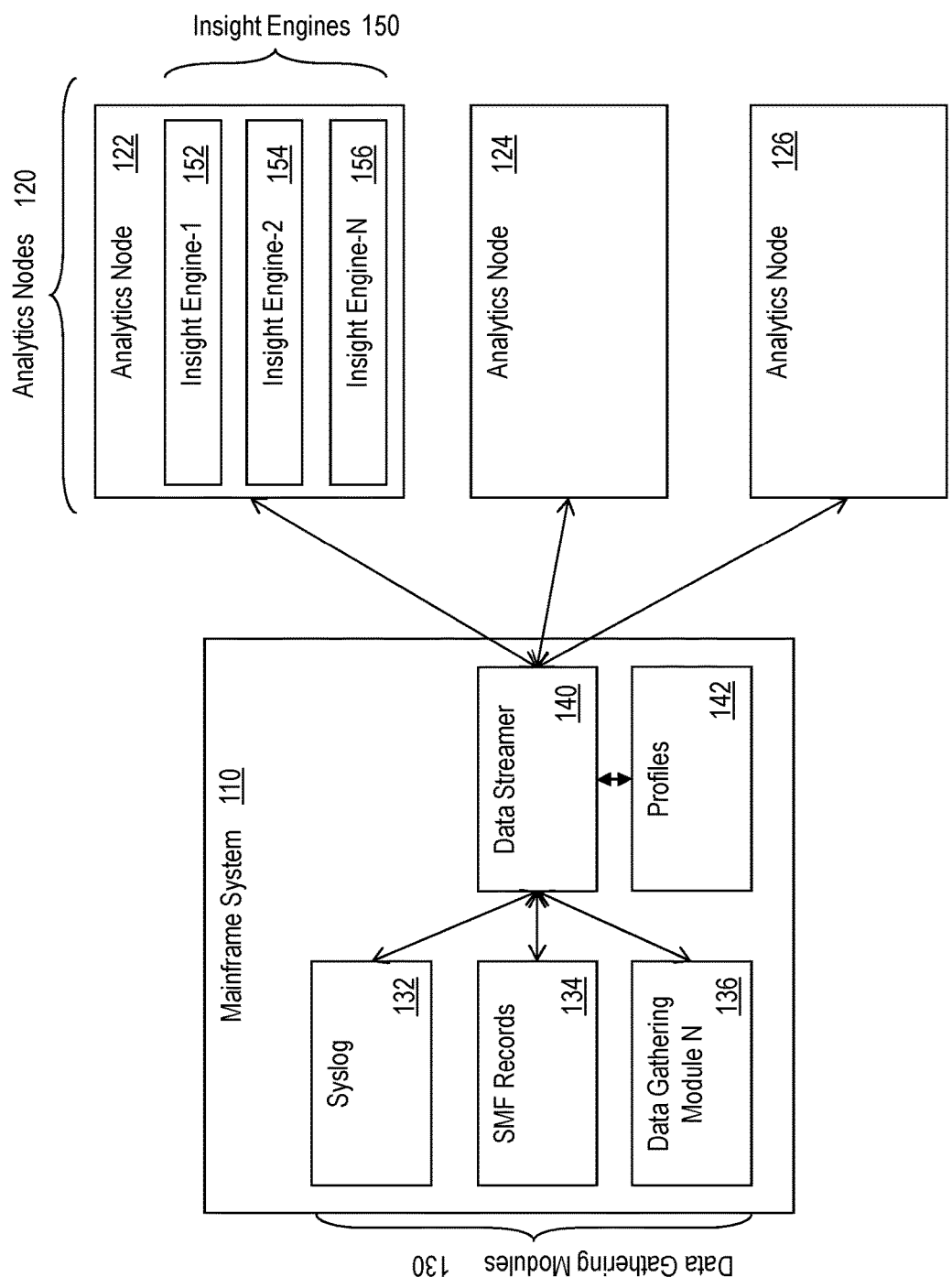
FIG. 3 illustrates an example system according to one or more embodiments.

FIG. 3 illustrates an example system 100 that implements the technical features described herein. For example, the system 100 includes a mainframe system 110, and a set of analytics nodes 120 that analyze data from the mainframe system 110.

In one or more examples, the mainframe system 110 is a server computer, such as an IBM™ Z-SYSTEM™ or the like. Alternatively, or in addition, the mainframe system 110 may be a server cluster, that includes one or more server computers. For example, the mainframe system 110 may be a distributed computing server. The mainframe system 100 includes multiple data gathering modules 130. It should be noted that the mainframe system 110 can include any number of data gathering modules, and those depicted in FIG. 3, is just one example.

A data gathering module is a component that includes hardware, such as electronic circuits, and software, such as computer executable instructions. The data gathering module facilitates the accumulation of specific data records.

For example, the data gathering modules 130 includes a syslog 132. The syslog 132 is a data gathering module that logs system messages from the mainframe system 100 during operation. In one or more examples, the syslog 132 monitors one or more computer program products that are executing on the mainframe system 100 and stores a message generated by any of the products. Typically, each message is labeled with an identifier, indicating the computer program product generating the message, a timestamp, an assigned a severity label, and other such information. The messages recorded and stored by the syslog 132 can be used for system management and security auditing as well as general informational analysis, and debugging the mainframe system 100 or any of the computer program products executing on the mainframe system 110.

Further, the data gathering modules 130 may include a system management facility (SMF) 134 that gathers SMF records. The SMF records can be used to evaluate system usage for the mainframe system 110. For example, an SMF record may include statistics for an allocated storage, or any other component of the mainframe system 110.

The data gathering modules 130 may include other such data gathering modules, for example data gathering module-N 136, which gathers other type of data associated with and during the operation of the mainframe system 110.

The set of analytics nodes 120 includes one or more analytics nodes. In one or more examples, an analytics node 122 from the set of analytics nodes 120 can be a computer, such as a computer server. The analytics node 122 may be another mainframe system. The analytics node 122 includes one or more insight engines 150.

An insight engine 152 may be a computer program product, such as a hardware component for example, field programmable array. Alternatively, or in addition, the insight engine 152 may be a computer program product, such as including one or more computer executable instructions stored on a non-transitory computer readable medium. The insight engine 152 analyzes specific data from the mainframe system 110 to generate a report. In one or more examples, the report provides an insight about the data from the mainframe system 100. For example, the insight engine 152 may generate a security insight that analyzes logon's to the mainframe system 110, looking for repeated failures or other logon anomalies. The insight engine 154 may generate a geographical-access insight about logons to the mainframe system 110 from one or more specific geographic regions. The insight engine 156 may generate a temporal-access insight about logons to the mainframe system 110 within one or more specific time periods. It should be noted that in other examples, the insight engines 150 may provide different, or additional insights than those in the above examples. For example, in other examples, the insight engines 150 may include an insight engine that analyzes processor utilization, or memory utilization, or storage utilization at the mainframe system 110. Further yet, in other examples, the insight engines 150 may include an insight engine that analyzes a number of views, or a number of clicks received by a specific computer program product, such as a web-site that is hosted by the mainframe system 110. Further yet, the insight engines 150 may include an insight engine that analyzes a resource utilization by each computer program product on the mainframe system 110.

In one or more examples, the insight engines 150 generate the data report and the insight by analyzing the data to identify one or more patterns. The patterns may be predetermined patterns. Alternatively, or in addition, the patterns may be dynamically identified, such as using machine learning.

The insight engine 152 uses and analyzes different data than the second insight engine 154, and the third insight engine 156. Further, even in case of the insight engine 152 using a common data as the second engine 154, the two insight engines may use the data in different format. For example, the insight engine 152 may request the logon data in a first data format, while the second insight engine 154 may request the logon data in a second data format. For example, the first data format may include fields that are associated with the analysis that the insight engine 152 performs, and further may exclude fields that the insight engine 152 does not use. Similarly, the second data format may be configured for the analysis performed by the second insight engine 154, by including data fields associated with the geographical location of the logon attempts, and excluding other data fields, such as timestamps.

The analytics nodes 120 may include N number of analytics nodes, such as a second analytics node 124, a third analytics node 126, and so on. Each of the analytics node 120 is a separate computer. Further, each of the analytics nodes 120 includes a separate set of insight engines 150.

In one or more examples, insight engines 150 from different analytics nodes 120 may analyze the data from the mainframe system 110. For example, the analytics engine 152 from the first analytics node 122 may analyze the security of the mainframe system 110, while the analytics engine 154 from the second analytics node 124 may analyze the geographical-access of the mainframe system 110. Further, the insight engines 150 may execute in parallel, whether the insight engines 150 are executing on the same analytics node or on separate analytics nodes. Thus, the mainframe system 110 may provide data for analysis to one or more analytics nodes 120 concurrently.

Still referring to FIG. 3, the mainframe system 110 further includes a data streamer module 140. The data streamer module 140 includes hardware such as an application-specific integrated circuit (ASIC), or an FPGA, or any other electronic circuit. In one or more examples, the data streamer module 140 further includes one or more computer executable instructions. The data streamer module 140 is responsible for streaming the data collected by the one or more data gathering modules 130 to the one or more analytics nodes 120. Typically, the data streamer 140 sends entire data collected by a data gathering module 136 to one or more of the analytics nodes 120.

The technical features described herein facilitate the data streamer to improve performance. For example, the technical features facilitate the data streamer 140 to determine specific data types that a certain analytics node uses and stream the specific data types to the analytics node.

In one or more examples, the data streamer 140 creates and maintains a profiles 142 for the analytics nodes 120. For example, a profile for the analytics node 122 includes a cumulative list of data types used by the one or more insight engines 150 executing on the analytics node 122. Accordingly, for the analytics node 122, the data streamer 140 accumulates and streams the data types listed in the cumulative list in the corresponding profile from the set of profiles 142. Alternatively, or in addition, the profiles 142 may be specific to the one or more insight engines executing on the one or more analytics nodes 120.

Figure 4:
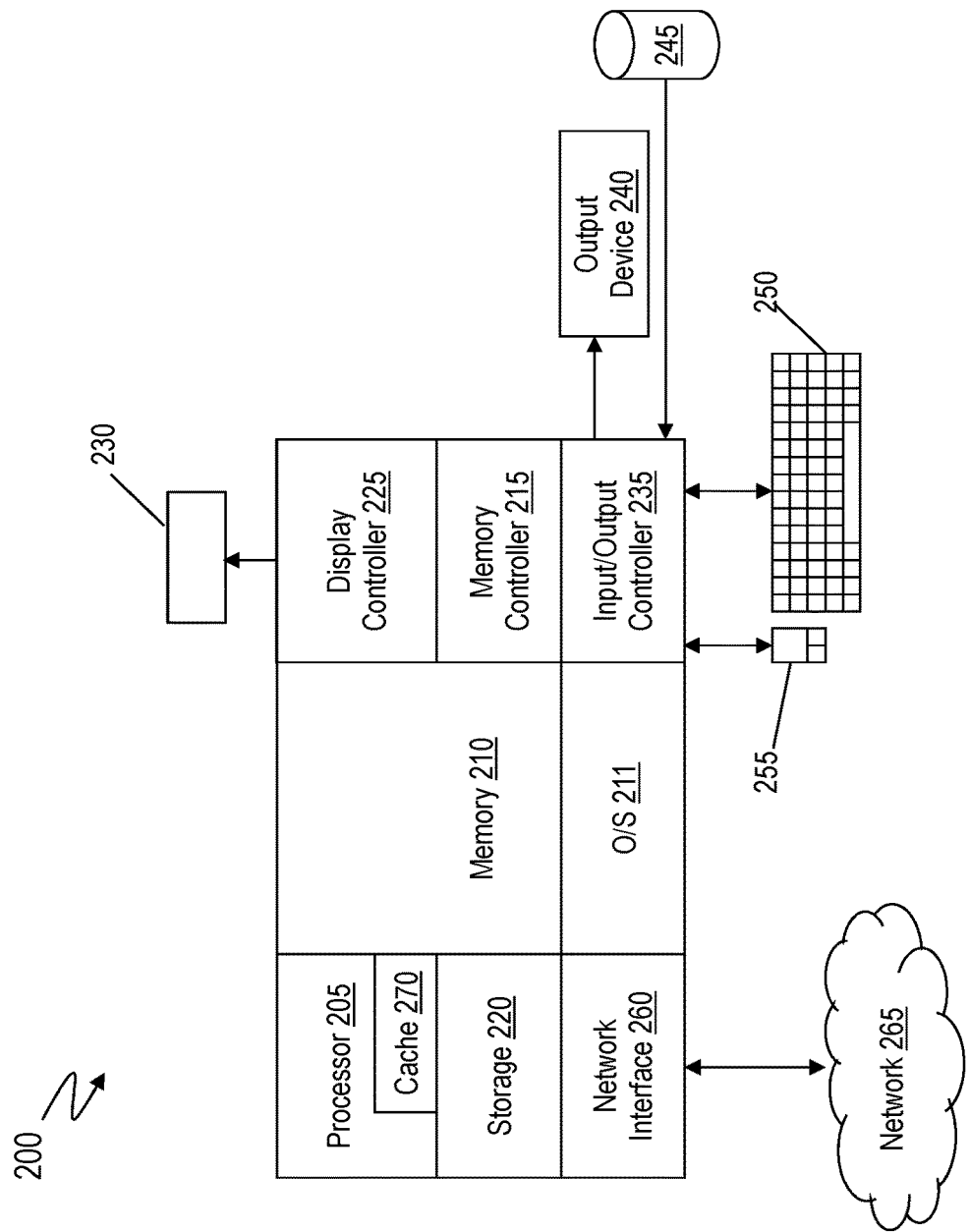
FIG. 4 illustrates an example computer system that implements technical features described herein according to one or more embodiments.

FIG. 4 illustrates an example computer system 200 that implements technical features described herein. The system 200 may operate as the mainframe system 110 and/or one of the analytics nodes 120. Alternatively, or in addition, the data streamer 140 may be the computer system 200. It should be noted that the mainframe system 110 and/or the analytics nodes 120 may include additional, or fewer components in other examples, than those illustrated in FIG. 4.

The computer system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the computer system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The computer system 200 may further include a display controller 225 coupled to a user interface or display 230. In some embodiments, the display 230 may be an LCD screen. In other embodiments, the display 230 may include a plurality of LED status lights. In some embodiments, the computer system 200 may further include a network interface 260 for coupling to a network 265. The network 265 may be an IP-based network for communication between the computer system 200 and an external server, client and the like via a broadband connection. In an embodiment, the network 265 may be a satellite network. The network 265 transmits and receives data between the computer system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
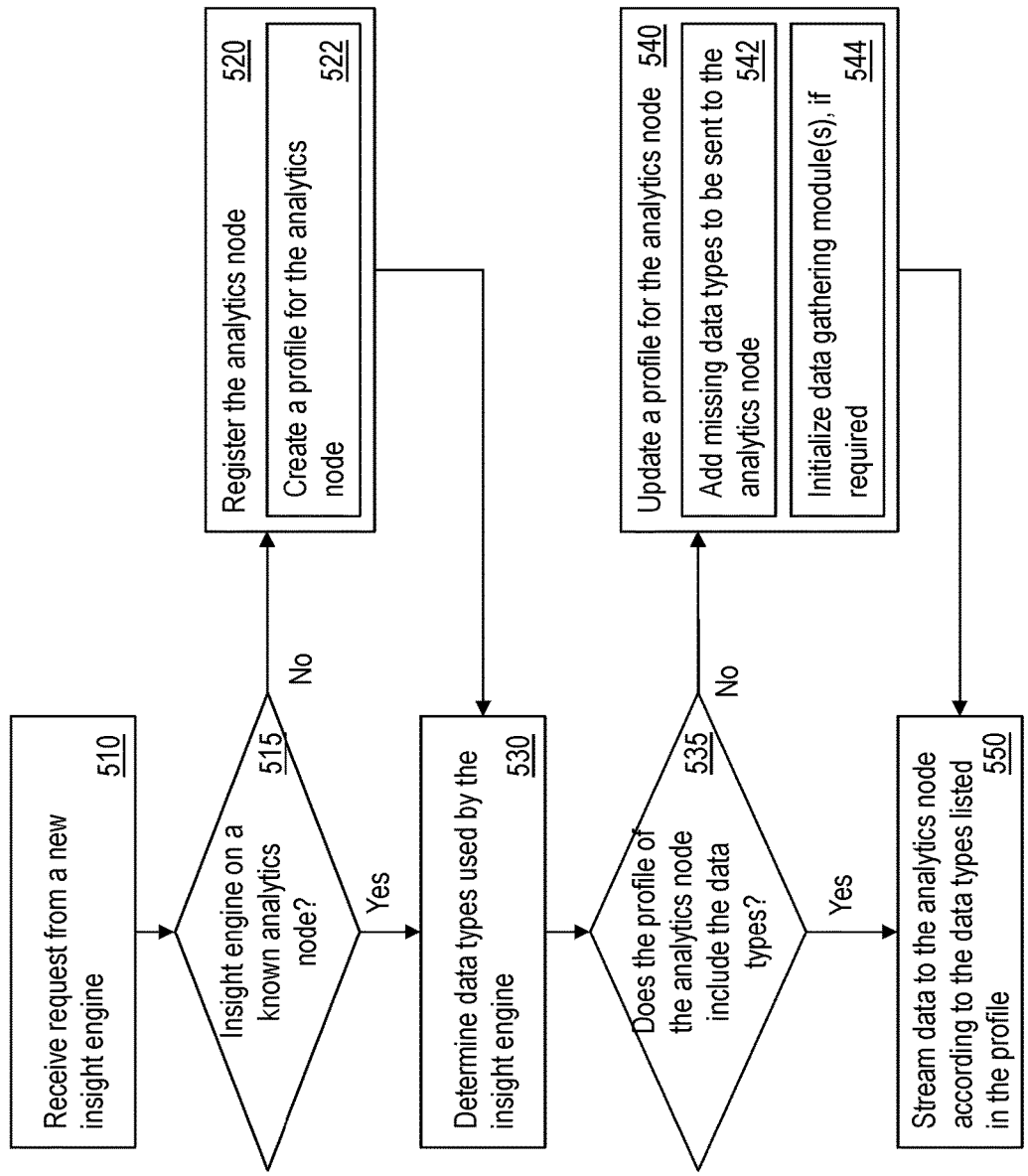
FIG. 5 illustrates an example method for configuring data streaming to analytics nodes according to one or more embodiments.

FIG. 5 illustrates an example method for configuring data streaming to the analytics nodes 150, according to one or more embodiments In one or more examples, the data streamer 140 executes the method. Alternatively, or in addition, one or more components from the mainframe system 110 executes the method.

The data streamer 140 receives a request from the insight engine 152 when the insight engine 152 initiates, as shown at 510. For example, the insight engine 152 may be initiated by an administrator or any other user to analyze the data from the mainframe system 110. In one or more examples, the insight engine 152, upon initialization requests the data streamer 140 for the data that the insight engine 152 uses for the analysis. The request for the data identifies the analytics node 122 that the insight engine 152 is being executed on. For example, the request includes an identifier for the analytics node 122, such as a MAC address, an IP address, a computer name, or any other unique identifier for the analytics node 122.

The data streamer 140 checks if the analytics node 122 is known to the data streamer 140, as shown at 515. For example, the data streamer 140 maintains a list of analytics nodes 150 that the data streamer sends data to, for one or more insights. The data streamer 140 compares the identifier of the analytics node 122 from the request with the list of analytics node identifiers and determines if the analytics node 122 is known.

If the identifier of the analytics node 122 is not included in the list, that is the analytics node 152 is not known, the data streamer 140 registers the analytics node 122, as shown at 520. For example, registering the analytics node 122 includes adding the identifier of the analytics node 122 in the list of identifiers. Further, the registration may include the data streamer 140 creating a profile for the analytics node 122 in the set of profiles 142, as shown at 522. The data streamer 140 records in the profile, the one or more data types that are to be sent to the analytics node 122. The data types include the one or more data types that are gathered by the data gathering modules 130.

If the identifier of the analytics node 122 is included in the list, that is the analytics node 152 is known, or after registering the analytics node 122, the data streamer 140 determines the data types that the newly initiated insight engine 152 uses for generating its insight(s), as shown at 530. In one or more examples, the insight engine 152, indicates to the data streamer 140 what data that it uses to generate the insight(s). For example, if the insight engine 152 generates a security insight that analyzes logon's to the mainframe system 110, looking for repeated failures or other logon anomalies, the insight engine 152 may use SMF records 134, and log records from the syslog 132.

The data streamer 140, in one or more examples, checks if the profile for the analytics node 122 already includes the data types that are requested by the newly initiated insight engine 152, as shown at 535. If the profile already includes the data types, the data streamer 140 continues to stream the data to the analytics node 122, as shown at 550.

Else, if the profile does not include the data types that are requested by the newly initiated insight engine 152, the data streamer 140 updates the profile, as shown at 540. Updating the profile includes adding the missing data types for the newly initiated insight engine 152 to the profile, as shown at 542. For example, in the above case, consider that the analytics node 122 already had another insight engine 154 that uses data from the SMF records 134, but no insight engine that uses data from the syslog 132. Accordingly, the data streamer 140 adds to the profile that the data from the syslog 132 is to be streamed to the analytics node 122, in this case to be used by the insight engine 152.

In one or more examples, updating the profile may further include switching one or more data gathering modules on (or off), as shown at 544. For example, if the syslog 132 was not being used by any of the analytics nodes 150 the mainframe system 110 may not execute the syslog module 132. By not executing the one or more data gathering modules that are not being used, the mainframe system 110 saves computer resources. Thus, the mainframe system 110 improves performance. In such a case, if the one or more data gathering modules are not being executed, the data streamer initializes the data gathering module(s) that gathers the data type(s) being requested, such as the syslog 132.

Further yet, in one or more examples, the data streamer 140 may request one or more data gathering modules 130 to start collecting a specific record type. For example, the SMF records 134 may only collect particular types of SMF records, such as SMF 01, SMF 08 and the like, and not all the types of SMF records. By limiting the types of SMR records being collected, the mainframe system 110 optimizes performance. If, for example, the newly initiated analytics engine 152 requests a specific type of SMR record, say SMF 08, that is not being gathered by the SMF records module 134, the data streamer 140 requests the SMF records module 134 to start gathering the specific type of data. Thus, the data streamer 140 can request a data gathering module to gather a specific type of data based on the initialization of an insight engine.

The data streamer 140, further, streams the data from the one or more data gathering modules 130 to the analytics node 122, according to the updated profile, as shown at 550.

The data streamer 140, accordingly facilitates the improvement of the performance of the mainframe system 110. Further, the data streamer 140 facilitates optimizing bandwidth usage during streaming of the data to the one or more analytics nodes 120 by streaming only the data types that are being analyzed by the analytics nodes 120. As described, when the data streamer 140 receives a new registration for an insight, the data streamer 140 determines the analytics node 122 that is executing the corresponding insight engine 152. For a new analytics node 122, where no previous insights have been running, the data steamer creates a node-link with details (IP address, port number and so on) for the analytics node 122. The data types used by the insight engine 152 are then attached to the analytic node 122, so the data streamer 140 knows which data types to send to that analytics node 122. For an existing/known analytics node 122 that the data streamer 140 is already sending data to, the data type information used by this analytics node 122 is updated with any new data type information requested by the insight engine 152 that is not currently being sent to that analytics node 122. The data streamer 140 thus maintains a cumulative list of data streams that are to be sent to the analytics node 122 to satisfy all of the insight engines 150 running on the analytics node 122. If the data streamer 140 is already sending the data types to that analytics node 122, then no changes are made.

Figure 6:
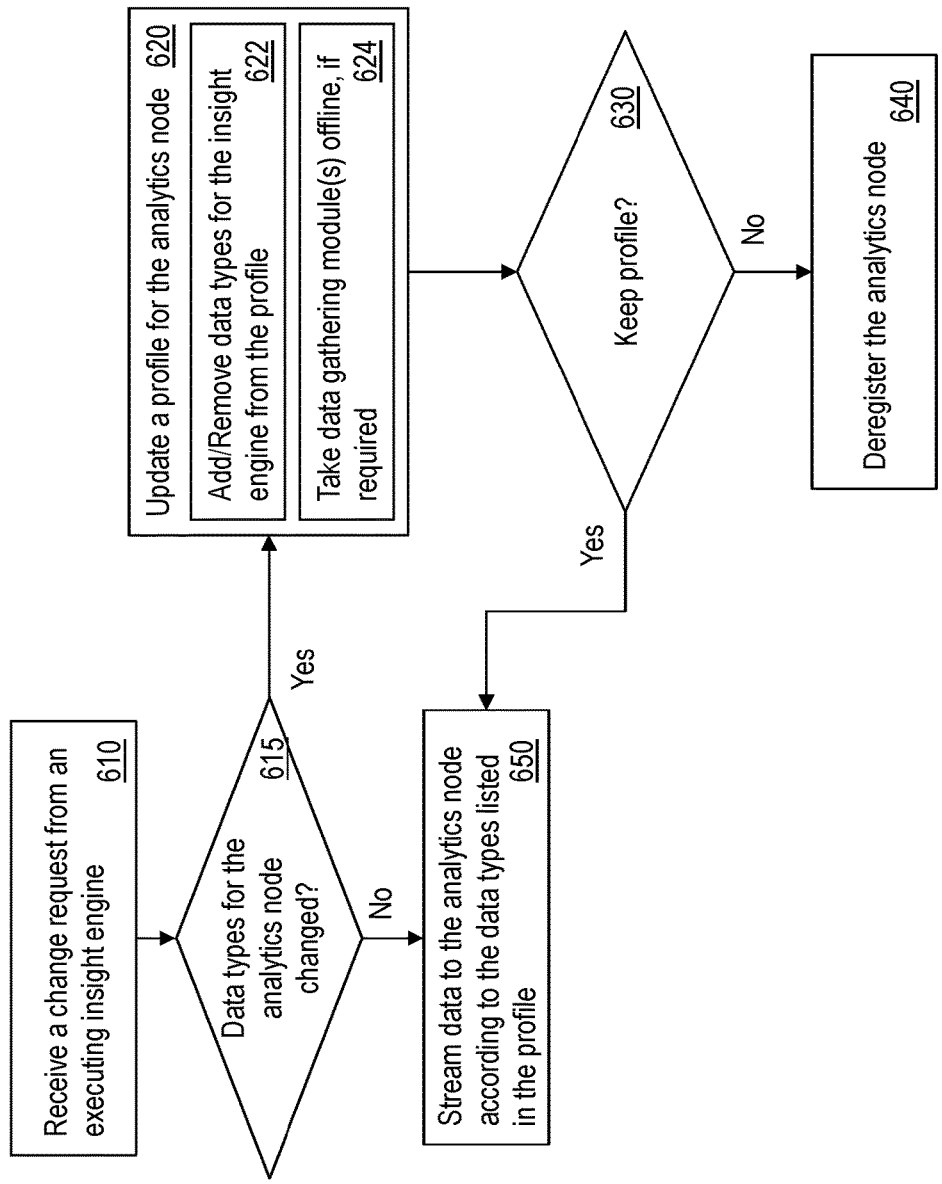
FIG. 6 illustrates a flowchart for an example method for updating a profile for an analytics node according to one or more embodiments.

FIG. 6 illustrates a flowchart of an example method for updating a profile for an analytics node, according to one or more embodiments. For example, the data streamer 140 may execute the method. In one or more examples, the method may be executed in response to receiving a change request from an executing insight engine, as shown at 610. An executing insights engine is any insights engine that is already analyzing data from the mainframe system 110. For example, consider that the analytics engine 152 is an executing engine. The change request may include a change in one or more data types that the insights engine 152 is using for the analysis. For example, the change may be to add one or more data types, or to remove one or more data types. Alternatively, or in addition, the change request may be to turn off the insights engine 152, for example, in response to the insights no longer being sought.

The data streamer 140, determines if the data types that are to be streamed to the analytics node 122 that is executing the insights engine 152 are changed, as shown at 615. For example, the data streamer 140 keeps count of the number of insight engine using a specific data type in the profile for the analytics node 122. In response to the insights engine 152 no longer using a data type, the data streamer 140 decrements the corresponding count of the data type. If the data type is still greater than zero, the data type is being used by another insights engine from the analytics node 122. Else, if the count for the data type reaches zero, the data types have changed. Correspondingly, the data streamer updates the profile, by removing the data type with the count zero, as shown at 620 and 624.

Further, in one or more examples, the data streamer requests the data gathering module 136 corresponding to the removed data type to turn off (or go offline), as shown at 624. For example, if none of the analytics modules 120 uses the data type, the data streamer 140 requests the data gathering module 136 to stop gathering the data type. Alternatively, or in addition, if the data gathering module 136 is gathering the removed data type only, the data streamer 140 may request the data gathering module 136 to be turned off. For example, the count maintained by the data streamer 140 in the profile is a global count corresponding to insight engines 150 from across the analytics nodes 120. Alternatively, or in addition, the data streamer 140 maintains two counts—a first count indicative of a number of insights engines from the specific analytics node corresponding to the profile that uses the data type; and a second count indicative of a number of insights engines from across the analytics node 120 using the data type.

Accordingly, the data streamer facilitates an improved performance of the mainframe system 110 by turning off collection of a data type or turning off a data gathering module altogether, thus saving computer resources.

Alternatively, or in addition, if the change requests adds a new data type, the data streamer 140 adds the data type to the profile of the analytics node 122, as shown at 620 and 622. Alternatively, if the data type is already in the profile, the data streamer increments the count of the data type to indicate another insights engine requesting that data type. It should be noted that the profile may be updated in a similar manner in the case of a newly initiated insights engine described above (see 540).

The data streamer 140 determines if the profile for the analytics node 122 is valued and is to be kept, as shown at 630. For example, if all the data types in the profile have a count of zero, the data streamer 140 concludes that none of the insights engines 150 from the analytics node 122 are requesting data. Hence, the data streamer 140 deregisters the analytics node 122, in such a case, as shown at 640. In one or more examples, deregistering the analytics node 122 includes removing the profile of the analytics node 122 from the set of profiles 142.

Alternatively, if at least one of the counts for the data types in the profile is non-zero, the data streamer maintains the profile and streams data to the analytics node 122 according to the profile, as shown at 650.

Accordingly, the technical solutions facilitate the improvement of performance of the mainframe system 110 in the case of an insight engine being switched off, or modified. For example, at any time, an analytics node may be taken offline, for example, due to the failure of the analytics node, or a power failure, or the like. Alternatively, or in addition, a specific insight engine on that analytics node may be removed or put on hold. In one or more examples, this generates a change request, such as a de-registration event with the data streamer 140, effectively requesting the data streamer 140 that the insight no longer uses the data types that are being sent. If the data streamer 140 does not have any other insight engine registered for that analytics node 122 that is using that specific data type, or no other analytics node is currently using that particular data type, then the data streamer has the data gathering module shut down, so as to limit the CPU load by only generating log data that is being used by the insight engines. If the analytics node comes back online at a later time, or if the insight engine is made active again, then the analytics engine is registered as described herein, and/or the corresponding profile updated.

The technical features described herein facilitate a data streamer to be dynamically aware of available insight engines and the core competencies per data type. The data streamer further routes specific data type to the appropriate underlying analytics nodes that are executing the insight engines based on the data types being used by the insights engines. The data streamer is thus a context aware data streamer that determines which analytics node to forward data to based on data type/goal/nature of the data relative to the available insight engines driven by a multitude of analytics nodes available at the time of data forwarding.

Further, when an insight engine comes online, the data streamer registers the insights engine, identifying the data types that the insights engine uses to generate its insights. Based on the registration, the data streamer turns on or off data gatherers depending on whether there are currently active insight engines using this data. The data streamer thus saves processor resources by turning off the generation of potentially voluminous data if there is no insight engine looking at this data on any of the analytic nodes. Additionally, the context-aware data streamer facilitates removing manual system administrator function, performing two distinct roles: a) install and configure the insight on a distributed machine; and b) configure the mainframe system to generate required data for the insight.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for streaming monitoring data to a plurality of analytics nodes, the method comprising:
   registering, by a data streamer of a mainframe system, an analytics node from the plurality of analytics nodes by creating a profile corresponding to the analytics node in a set of profiles, wherein the analytics node executes a plurality of insight engines;
   adding, to the profile, a first data type used by a first insight engine of the plurality of insight engines, wherein the first insight engine is configured to analyze data from the mainframe system to generate a report that provides an insight about the data from the mainframe system, wherein the insight comprises an analysis of processor utilization, memory utilization or storage utilization at the mainframe system;
   streaming, from the mainframe system and by the data streamer, data of the first data type to the analytics node, based on the profile, for the first insight engine to analyze, wherein the mainframe system comprises a server computer and the data streamer is configured to stream data collected by one or more data gathering modules of the mainframe system that accumulate data records from the mainframe system during operation of the mainframe system;
   in response to a second insight engine of the plurality of insight engines requesting the first data type, updating the profile of the analytics node by incrementing a count for the first data type, the count being indicative of a number of insight engines of the analytics node using the first data type;
   in response to the second insight engine being turned off, updating the profile to decrement the count for the first data type;
   in response to the count for the first data type being zero, turning off a data gathering module of the mainframe system from gathering data of the first data type and updating the profile of the analytics node by removing the first data type; and
   in response to each count of a plurality of counts of the profile of the analytics node being zero, wherein the each count of the plurality of counts corresponds to a data type of a plurality of data types used by any of the plurality of insight engines of the analytics node, deregistering the analytics node and removing the profile of the analytics node from the set of profiles.

2. The computer implemented method of claim 1, wherein the method further comprises:
   receiving an initialization notification from a third insight engine being executed by the analytics node;
   updating the profile for the analytics node by adding a second data type used by the third insight engine, wherein the plurality of data types comprise the second data type; and
   streaming the data of the first data type and the second data type to the analytics node according to the profile.

3. The computer implemented method of claim 2, further comprising determining the second data type used by the third insight engine based on the initialization notification.

4. The computer implemented method of claim 2, further comprising:
   determining that the second data type is absent from the profile for the analytics node; and
   in response, updating the profile.

5. The computer implemented method of claim 2, further comprising:
   determining that the second data type is not being gathered by a data gathering module; and
   in response, initializing the data gathering module to gather the second data type.

6. The computer implemented method of claim 1, wherein the analytics node is registered in response to receiving an initialization notification from the first insight engine and further if an identifier of the analytics node absent from a list of identifiers of analytics nodes that are receiving data from the data streamer.

7. A system for streaming monitoring data to a plurality of analytics nodes, the system comprising:
   a memory; and
   a processor that is coupled with the memory, the processor configured to:
   register, by a data streamer of a mainframe system, an analytics node from the plurality of analytics nodes by creating a profile corresponding to the analytics node in a set of profiles, wherein the analytics node executes a plurality of insight engines;

add, to the profile, a first data type used by a first insight engine of the plurality of insight engines, wherein the first insight engine is configured to analyze data from the mainframe system to generate a report that provides an insight about the data from the mainframe system, wherein the insight comprises an analysis of processor utilization, memory utilization or storage utilization at the mainframe system;

stream, from the mainframe system and by the data streamer, data of the first data type to the analytics node, based on the profile, for the first insight engine to analyze, wherein the mainframe system comprises a server computer and the data streamer is configured to stream data collected by one or more data gathering modules of the mainframe system that accumulate data records from the mainframe system during operation of the mainframe system;

in response to a second insight engine of the plurality of insight engines requesting the first data type, update the profile of the analytics node by incrementing a count for the first data type, the count being indicative of a number of insight engines of the analytics node using the first data type;

in response to the second insight engine being turned off, update the profile to decrement the count for the first data type;

in response to the count for the first data type being zero, turn off a data gathering module of the mainframe system from gathering data of the first data type and update the profile of the analytics node by removing the first data type; and in response to each count of a plurality of counts of the profile of the analytics node being zero, wherein the each count of the plurality of counts corresponds to a data type of a plurality of data types used by any of the plurality of insight engines of the analytics node, deregister the analytics node and remove the profile of the analytics node from the set of profiles.

8. The system of claim 7, wherein the processor is further configured to:
   receive an initialization notification from a third insight engine being executed by the analytics node;
   update the profile for the analytics node by adding a second data type used by the third insight engine, wherein the plurality of data types comprise the second data type; and
   stream the data of the first data type and the second data type to the analytics node according to the profile.

9. The system of claim 8, wherein the processor further configured to determine the second data type used by the third insight engine based on the initialization notification.

10. The system of claim 8, wherein the processor further configured to:
    determine that the second data type is absent from the profile for the analytics node; and
    in response, update the profile.

11. The system of claim 8, wherein the processor further configured to:
    determine that the second data type is not being gathered by a data gathering module; and
    in response, initialize the data gathering module to gather the second data type.

12. A computer program product for streaming monitoring data to a plurality of analytics nodes, the computer program product comprising a computer readable storage medium having program instructions embodied therewith, the program instructions executable by a processing circuit to cause the processing circuit to:
    register, by a data streamer of a mainframe system, an analytics node from the plurality of analytics nodes by creating a profile corresponding to the analytics node in a set of profiles, wherein the analytics node executes a plurality of insight engines;
    add, to the profile, a first data type used by a first insight engine of the plurality of insight engines, wherein the first insight engine is configured to analyze data from the mainframe system to generate a report that provides an insight about the data from the mainframe system, wherein the insight comprises an analysis of processor utilization, memory utilization or storage utilization at the mainframe system;
    stream, from the mainframe system and by the data streamer, data of the first data type to the analytics node, based on the profile, for the first insight engine to analyze, wherein the mainframe system comprises a server computer and the data streamer is configured to stream data collected by one or more data gathering modules of the mainframe system that accumulate data records from the mainframe system during operation of the mainframe system;
    in response to a second insight engine of the plurality of insight engines requesting the first data type, update the profile of the analytics node by incrementing a count for the first data type, the count being indicative of a number of insight engines of the analytics node using the first data type;
    in response to the second insight engine being turned off, update the profile to decrement the count for the first data type;
    in response to the count for the first data type being zero, turn off a data gathering module of the mainframe system from gathering data of the first data type and update the profile of the analytics node by removing the first data type; and
    in response to each count of a plurality of counts of the profile of the analytics node being zero, wherein the each count of the plurality of counts corresponds to a data type of a plurality of data types used by any of the plurality of insight engines of the analytics node, deregister the analytics node and remove the profile of the analytics node from the set of profiles.

13. The computer program product of claim 12, wherein the program instructions further cause the processing circuit to:
    receive an initialization notification from a third insight engine being executed by the analytics node;
    update the profile for the analytics node by adding a second data type used by the third insight engine, wherein the plurality of data types comprise the second data type; and
    stream the data of the first data type and the second data type to the analytics node according to the profile.

* * * * *